FITTS & THACKARA.
Hand-Plow

No. 39,560. Patented Aug. 18, 1863.

UNITED STATES PATENT OFFICE.

R. B. FITTS AND J. W. THACKARA, OF PHILADELPHIA, PENNSYLVANIA.

IMPROVED HAND-CULTIVATOR.

Specification forming part of Letters Patent No. 39,560, dated August 18, 1863; antedated January 16, 1863.

*To all whom it may concern:*

Be it known that we, R. B. FITTS and J. W. THACKARA, of the city of Philadelphia, in the State of Pennsylvania, have invented a new and useful Improvement in Hand-Cultivators; and we do hereby declare that the following is a full, clear, and exact description of the construction and operation of the same, reference being had to the accompanying drawings, making a part of this specification, in which—

Figure 1:
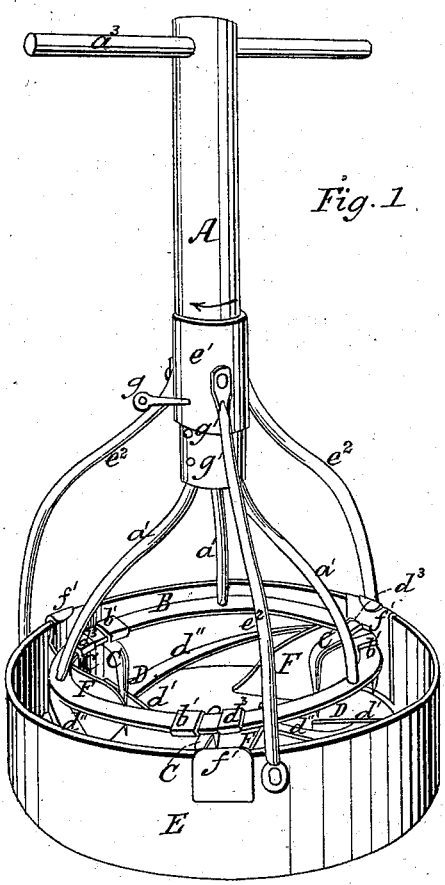
Figure 2:
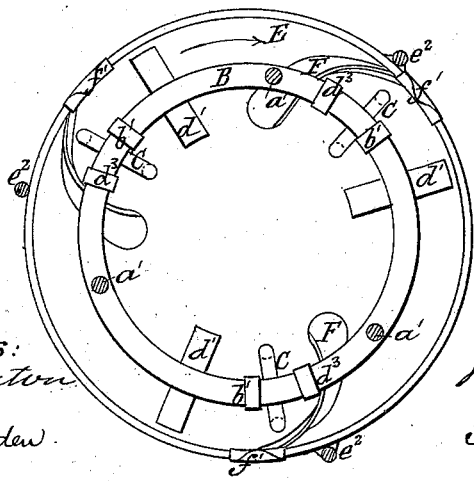

Figure 1 is a perspective view of the improved implement, and Fig. 2 a sectional plan view of the same, like letters in both figures indicating the same parts.

The object of our invention is the production of a hand implement for cultivating in a more expeditious and perfect manner strawberry, cabbage, and such other plants as require to be grown singly or in hills.

It consists of a central vertical handle or stem attached to a ring provided with a series of detachable breaking or harrowing teeth, and a like series of detachable cutting-scrapers, and also carrying an adjustable cylindrical cutter provided with a series of detachable hilling-plates, the whole being constructed and arranged so as to be operated substantially as is hereinafter described.

In the drawings, A is the central vertical stem; B, the ring attached thereto; C C C, the detachable breaking or harrowing teeth; D D D, the detachable cutting-scrapers; E, the adjustable cylindrical cutter, and F F F the detachable hilling-plates.

The central stem, A, is fixed perpendicularly over the center of the ring B by means of the arms $a'$ $a'$ $a'$, which branch from its lower end substantially in the manner shown in Fig. 1.

The series of detachable harrowing-teeth C C C consists of three pairs of long pointed teeth, each pair being formed with a wedge-like projection or stem at its upper end, which, being driven in between the lower side of the ring B and a thimble, $b'$, thereon, is thus held firmly in a radial position and nearly perpendicular to the plane of the ring, each pair being arranged also at about equal distances apart around the said ring, as seen in the drawings.

The series of cutting-scrapers D D D consists of three distinct rectangular plates, $d'$, having their lower edges sharpened and placed each in an inclined radial position beneath the ring B by means of a flat spring-arm, $d^2$, which extends therefrom into a sliding thimble, $d^3$, and is secured therein by a wedge, substantially in the manner in which the rakes C are held to the same ring. They are also arranged so that their cutting-plates $d'$ may be at about equal distances apart and about in the same plane with the lower ends or points of the rakes C C C.

The cylindrical cutter E is a band of plate-steel formed with a cutting-edge at its lowest position, and is attached to the stem A by means of a sleeve, $e'$, which fits around the stem, and the arms $e^2$ $e^2$ $e^2$, which branch obliquely downward from the lower end of the sleeve, as seen in Fig. 1. A pin or bolt, $g$, passes through the sleeve $e'$ and any one of a series of holes, $g'$, in the stem A, so as to hold the sleeve $e'$ firmly on the stem at any height the adjustment of the cutter E may require.

At equal distances apart, around in the inner side of the cutter E, the series of hilling-plates F F F are arranged. These plates are each curved and twisted so that they shall operate in a manner similar to that of the moldboard of a plow, to throw the loosened earth inward or toward the center of the implement as the latter is operated, and are applied by means of a lapping piece, $f'$ which clamps firmly against the outside of the cutter E, and over the upper edges of the plates F, so as to hold them firmly in the positions shown in the drawings, and so, also, as to allow of their being readily detached when so required.

The upper end of the stem A is provided with a cross-handle, $a^3$, whereby the implement is operated while in use.

Operation: The cross-handle $a^3$ being grasped firmly in both hands, and the implement placed upon the ground and over the plant to be cultivated, so that the latter shall be in the center of the ring B, the operator presses downward, and at the same time rotates the implement about half-way round in the direction of the arrow marked on each figure of the drawings, thus loosening or breaking up the ground around the plant by means of the teeth C C C cutting the weeds by means of the cutting-scrapers D D D, throwing the loosened dirt, by means of the hilling-plates F F F, around the stem of the plant, and cutting off by means of the cylindrical cutter E all vines or runners proceeding from the said plant. It will not probably be often required in any case that all these distinctive operations be performed at once, and hence the reason why the cylindrical cutter E is attached so that it can be suspended above the ring B, and why the several parts, C D F, also, are attached so that they can be readily removed or replaced as the peculiarities of the plant may require in its cultivation—as, for instance, in cultivating strawberry plants or vines the cylindrical cutter will be required to be used simply for cutting off the runners, without hilling or weeding, in which case the plates F and teeth C should be detached, while in cultivating cabbage and other plants which require hilling, the curved plates F will be required and perhaps the cutting-scrapers D dispensed with, and in some other cases the parts C and D will be required without the aid of the cutter E. As only a single half-turn of the implement around the plant will be sufficient for the purpose, and requires only a moment of time to effect it, the operator has only to step from one plant to the next in succession to perform it, and hence it is manifest that greater expedition and perfection in the cultivation of such plants will be afforded by the use of the implement.

Having thus fully described our improved hand-cultivator and pointed out its superior utility, what we claim as new therein of our invention, and desire to secure by Letters Patent, is—

1. The stem A, in combination with the ring B, constructed and arranged to receive the detachable teeth C C C and cutting-scrapers D D D, substantially in the manner described and set forth, for the purposes specified.

2. The teeth C C C, in combination with the ring B, the said teeth being arranged so that they may be detached, substantially as described, for the purpose specified.

3. The cutting-scrapers D D D, in combination with the ring B, the said scrapers being arranged substantially as described, for the purpose specified.

4. In combination with the stem A and ring B, the cylindrical cutter E, the same being made adjustable on the stem A, substantially as described and set forth, for the purposes specified.

5. In combination with the cylindrical cutter E, the detachable hilling-plates F F F, the said plates being formed and arranged to operate therewith in the manner substantially as described, for the purpose specified.

R. B. FITTS.
J. W. THACKARA.

Witnesses:
BENJ. MORISON,
JAMES P. DIX.